United States Patent
Choi et al.

(10) Patent No.: US 9,244,251 B2
(45) Date of Patent: Jan. 26, 2016

(54) WIDE-ANGLE PHOTOGRAPHIC LENS SYSTEM ENABLING CORRECTION OF DISTORTION

(71) Applicant: Sekonix Co., Ltd., Dongducheon, Gyeonggi-Do (KR)

(72) Inventors: Soon Chul Choi, Gyeonggi-Do (KR); Seung Nam Nam, Gyeonggi-Do (KR); Ki Youn Noh, Gyeonggi-Do (KR)

(73) Assignee: Sekonix Co., Ltd., Dongducheon-Si (KR)

( * ) Notice: Subject to any disclaimer, the term of this patent is extended or adjusted under 35 U.S.C. 154(b) by 218 days.

(21) Appl. No.: 14/134,561

(22) Filed: Dec. 19, 2013

(65) Prior Publication Data
US 2015/0085382 A1    Mar. 26, 2015

(30) Foreign Application Priority Data

Sep. 24, 2013  (KR) ........................ 10-2013-0113178

(51) Int. Cl.
*G02B 9/58*    (2006.01)
*G02B 15/14*   (2006.01)
*G02B 3/02*    (2006.01)
*G02B 13/00*   (2006.01)
*G02B 13/04*   (2006.01)

(52) U.S. Cl.
CPC ................ *G02B 9/58* (2013.01); *G02B 13/004* (2013.01); *G02B 13/04* (2013.01)

(58) Field of Classification Search
USPC .......................... 359/686, 715, 771, 781, 782
See application file for complete search history.

*Primary Examiner* — Jack Dinh
(74) *Attorney, Agent, or Firm* — Locke Lord LLP; Christopher J. Capelli; Daniel J. Fiorello

(57) ABSTRACT

A wide-angle photographic lens system enabling correction of distortion composed of four lenses, in which a first lens, an iris, a second lens, a third lens and a fourth lens sequentially arranged along an optical axis from an object, wherein the first lens has weak refractivity, the second lens has positive refractivity, the third lens has strong positive refractivity, and the fourth lens has negative refractivity, wherein the lens system satisfies relations, $|f1/f|>4$, $f3/f<1.5$, and $te/tc<0.5$, wherein f1 is a focal length of the first lens, f is a total focal length of all the lenses, f3 is a focal length of the third lens, to is a lens thickness on an effective diameter of a rear surface of the third lens, and tc is a center thickness of the third lens.

16 Claims, 4 Drawing Sheets

WIDE-ANGLE PHOTOGRAPHIC LENS SYSTEM ENABLING CORRECTION OF DISTORTION

CROSS REFERENCE TO RELATED APPLICATION(S)

This application claims the benefit of Korean Patent Application No. 10-2013-0113178, filed on Sep. 24, 2013, entitled "Wide-angle photographic lens system enabling correction of distortion", which is hereby incorporated by reference in its entirety into this application.

BACKGROUND OF THE INVENTION

1. Technical Field

The present invention relates to a wide-angle photographic lens system composed of four lenses and, more particularly, to a wide-angle photographic lens system enabling correction of distortion, in which refractivities and shapes of respective lenses, incidence angles of a main beam of light in the lenses, and intervals between the lenses, etc. are appropriately designed, so the lens system can realize lightness and smallness and can enable correction of distortion, thereby having a distortion-corrected angle of view of 90° or more and providing an image with high resolution.

2. Description of the Related Art

In recent years, the use of mobile phone cameras and digital cameras has increased and services provided by mobile phone cameras and digital cameras are required to be diversified, for example functions such as photographing, picture transmission or communication are strongly required.

Particularly, photographic lens units of mobile phone cameras are required to provide improved and diverse functions. To this end, a new concept mobile phone, which is formed by combining a digital camera technique with a mobile phone technique and is a so-called "camera phone" (or camera mobile phone), has been proposed and spotlighted. To realize the requirements of high efficiency of the camera phone, a camera module in which an image sensor having at least 3-megapixel size has been actively studied recently.

To realize the requirements of high definition and a highly efficient function at higher than at least a 3-megapixel size, at least three to four lenses are used in the camera module of the mobile phone camera.

Examples of conventional techniques proposed to realize the requirements of high definition and high efficiency are referred to in the following patent documents.

Japanese Patent Laid-open Publication No. Hei 08-262322 discloses a wide-angle lens system, in which a first lens having negative refractivity, a second lens having positive refractivity, and third and fourth lenses made of synthetic resin and having positive refractivity are sequentially arranged along an optical axis from an object. Here, the total focal length and ABBE numbers of the lenses are designed to satisfy predetermined conditions.

Further, Korean Patent No. 0711024 discloses a laminated lens system having ultra small size and high resolution, which is composed of a first lens, a second lens, a third lens and a fourth lens, wherein the first lens has positive refractivity, the second lens has negative refractivity, the first and second lens are made of optical glass, the front surface of the first lens and the rear surface of the second lens are configured as spherical surfaces, and the rear surface of the first lens and the front surface of the second lens are configured to form flat surfaces that are joined to each other.

As described above, although a plurality of techniques relating to optical lens systems have been proposed in the related art, a conventional wide-angle lens system having an angle of view of 90° or more is problematic in that the lens system excessively distorts images, and is not easy to realize smallness, and it increases production cost due to use of many lenses, thereby increasing the price of the lens system.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a wide-angle photographic lens system enabling correction of distortion, in which refractivities and shapes of respective lenses, incidence angles of a main beam of light in the lenses, and intervals between the lenses, etc. are appropriately designed, so the lens system can realize lightness and smallness and can enable correction of distortion, thereby providing wide-angle images having an angle of view of 90° or more.

In one aspect of the present invention, there is provided a wide-angle photographic lens system enabling correction of distortion, including: a first lens, an iris, a second lens, a third lens and a fourth lens sequentially arranged along an optical axis from an object, wherein the first lens has weak refractivity, the second lens has positive refractivity, the third lens has strong positive refractivity, and the fourth lens has negative refractivity, wherein the lens system satisfies relations, $|f1/f|>4$, $f3/f<1.5$, and $te/tc<0.5$, wherein $f1$ is a focal length of the first lens, $f$ is a total focal length of all the lenses, $f3$ is a focal length of the third lens, te is a lens thickness on an effective diameter of a rear surface of the third lens, and tc is a center thickness of the third lens.

Further, the wide-angle photographic lens system enabling correction of distortion may be designed such that incidence angles of a main beam of light in a field not less than 60% of a maximum image height in the lens system satisfies a relation, $A\_fr < A\_s$, wherein $A\_fr$ is an incidence angle of the main beam of light received on a tangent of a center of a front surface of the first lens, and $A\_s$ is an incidence angle of the main beam of light received on the iris.

Further, the wide-angle photographic lens system enabling correction of distortion may be designed to satisfy a relation, $|R\_L1S1/f|>2.5$, wherein $R\_L1S1$ is a radius of curvature of a front surface of the first lens, and may be designed to satisfy a relation, $h\_L1S1 < h\_L4S2$, wherein $h\_L1S1$ is an effective diameter of a front surface of the first lens, and $h\_L4S2$ is an effective diameter of a rear surface of the fourth lens.

Further, the wide-angle photographic lens system enabling correction of distortion may be designed to satisfy a relation, $t3/t > 0.07$, wherein $t3$ is an interval between a rear surface of the first lens and the iris, and $t$ is a total length of the lens system which is a distance from a front surface of the first lens to an image surface, and may be designed to satisfy a relation, $f234/f > 0.85$, wherein $f$ is the total focal length of all the lenses, and $f234$ is a sum of focal lengths of the second lens, the third lens and the fourth lens.

Here, the first lens may have aspheric surfaces on opposite surfaces, the second lens may have an aspheric surface on at least one surface, the third lens may have aspheric surfaces on opposite surfaces, the fourth lens may have aspheric surfaces on opposite surfaces, and any one or more of the first lens, the second lens, the third lens and the fourth lens may be made of a material different from a material of remaining lenses.

As described above, the present invention provides a wide-angle photographic lens system composed of four lenses, which is used in a mobile phone camera, a digital camera, a PC camera, etc., realizes smallness of the camera, and provides wide-angle images having an angle of view of 90° or more and high resolution images.

Further, the wide-angle photographic lens system of this invention is configured such that, in a field not less than 60% of the maximum image height in the lens system, the incidence angle A_s of a main beam of light received on an iris is larger than the incidence angle A_fr of the main beam of light received on a tangent of the center of the front surface of the first lens, so a camera using the wide-angle photographic lens system can provide images having high resolution.

DESCRIPTION OF THE PREFERRED EMBODIMENTS

Figure 1:
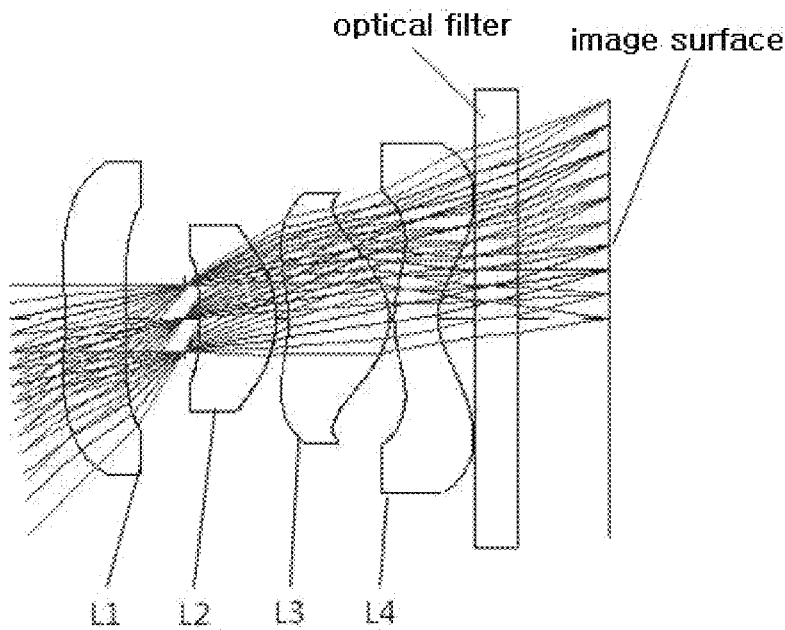
FIG. 1 is a view illustrating a wide-angle photographic lens system enabling correction of distortion according to a first embodiment of the present invention.

The present invention relates to a photographic lens system composed of four lenses, in which a first lens, an iris, a second lens, a third lens and a fourth lens are sequentially arranged along an optical axis from an object.

Hereinafter, the present invention will be described in detail with reference to the accompanying drawings.

The present invention relates to a wide-angle photographic lens system enabling correction of distortion, in which a first lens, an iris, a second lens, a third lens and a fourth lens are sequentially arranged along an optical axis from an object, wherein the first lens has weak refractivity, the second lens has positive refractivity, the third lens has strong positive refractivity, and the fourth lens has negative refractivity, and the lens system satisfies relations, $|f1/f|>4$, $f3/f<1.5$ and $te/tc<0.5$.

In the above relations, f1 is a focal length of the first lens, f is a total focal length of all the lenses, f3 is a focal length of the third lens, te is a lens thickness on an effective diameter of a rear surface of the third lens, and tc is a center thickness of the third lens.

In the relations, the focal length of the first lens is longer than the focal length of remaining lenses, and the focal length of the third lens is shorter than the focal lengths of remaining lenses. Further, the center thickness of the third lens is substantially larger than the thickness on the effective diameter of the rear surface of the third lens.

The relation, $|f1/f|>4$, is provided to define the focal length of the first lens or the refractivity of the first lens. Here, it is noted that the first lens has a longer focal length compared to remaining lenses, so the first lens has weak refractivity. When the refractivity of the first lens is excessively increased, the spherical aberration and coma aberration are undesirably increased, so it is preferred that the first lens has weak refractivity.

Further, the relations, $f3/f<1.5$ and $te/tc<0.5$, are provided to define the focal length and shape of the third lens. That is, when the focal length of the third lens is increased to exceed a maximum value, aberration may be increased. Accordingly, to compensate for distortion, the third lens is designed such that the center thickness of the third lens is increased.

As described above, the lens system of the present invention has positive refractivity, which is composed of the first lens having weak refractivity, the second lens having positive refractivity, the third lens having strong positive refractivity, and the fourth lens having negative refractivity.

Particularly, to compensate for aberration, the lenses of this lens system are configured such that the first lens has weak positive or negative refractivity according to refractivity of the second lens, the third lens has strong positive refractivity, and the fourth lens has negative refractivity, thereby correcting distortion and improving the resolution in the center and peripheral portion of images.

Further, the fourth lens is configured such that it has negative refractivity and the rear surface thereof is concave in a direction to an image surface, thereby compensating for the curvature of image field. Accordingly, the fourth lens can minimize the difference of image quality between the center portion and the peripheral portion of an image and can provide images having high resolution.

Further, the wide-angle photographic lens system according to the present invention is designed such that incidence angles of a main beam of light in a field not less than 60% of a maximum image height in the lens system satisfy a relation, $A\_fr < A\_s$, wherein A_fr is an incidence angle of the main beam of light received on a tangent of a center of a front surface of the first lens, and A_s is an incidence angle of the main beam of light received on the iris. The relation is provided to design the first lens such that the incidence angle A_s of the main beam of light received on the iris is larger than the incidence angle A_fr of the main beam of light received on the tangent of the center of the front surface of the first lens.

Accordingly, the lens system of the present invention can compensate for distortion aberration and can produce an image of an object that is perpendicular to the optical axis on the image surface perpendicular to the optical axis in such a way that the image and the object bear resemblance to each other.

Further, the wide-angle photographic lens system according to the present invention is designed to satisfy a relation, $|R\_L1S1/f|>2.5$. The relation is provided to design the lens system such that the absolute value of the ratio of the radius of curvature R_L1S1 of the front surface of the first lens to the total focal length f is larger than 2.5, so the incidence angle of the main beam of light received on the iris becomes larger than the incidence angle of the main beam of light received on the tangent of the center of the front surface of the first lens.

Further, the lens system of the present invention is designed to satisfy a relation, h_L1S1<h_L4S2, wherein h_L1S1 is an effective diameter of the front surface of the first lens, and h_L4S2 is an effective diameter of the rear surface of the fourth lens. The relation is provided to design the lens system such that the effective diameter of the rear surface of the fourth lens is larger than the effective diameter of the front surface of the first lens, thereby correcting distortion and realizing smallness of the lens system.

Further, the lens system of the present invention is designed to satisfy a relation, t3/t>0.07, wherein t3 is an interval between the rear surface of the first lens and the iris, and t is a total length of the lens system which is a distance from the front surface of the first lens to the image surface. The relation is provided to design the lens system such that the ratio of the interval between the rear surface of the first lens and the iris to the total length of the lens system is larger than 0.07, thereby realizing a wide angle of view of 90° or more.

Further, the wide-angle photographic lens system according to the present invention is designed to satisfy a relation, f234/f>0.85, wherein f is the total focal length of all the lenses, and f234 is a sum of the focal lengths of the second lens, the third lens and the fourth lens.

Further, it is desired that the wide-angle photographic lens system according to the present invention is designed such that the first lens has aspheric surfaces on opposite surfaces, the second lens has an aspheric surface on at least one surface, the third lens has aspheric surfaces on opposite surfaces, and the fourth lens has aspheric surfaces on opposite surfaces. In the lens system, a material of any one of the first lens, the second lens, the third lens and the fourth lens may be different from a material of remaining lenses.

In other words, to compensate for spherical aberration, it is desired that at least one surface of each of the respective lenses is shaped as an aspheric surface, and that the respective lenses are made of materials prepared by appropriately mixing glass or plastic materials, thereby efficiently compensating for chromatic aberration.

The above-mentioned shapes and materials of the first lens, second lens, third lens and fourth lens are defined to optimize the performance of the optical system by minimizing the spherical aberration, coma aberration, curvature of image field, distortion aberration and chromatic aberration, and to reduce the size of the optical system.

Hereinbelow, embodiments of the present invention will be described.

First Embodiment

FIG. 1 shows a wide-angle photographic lens system having an angle of view of 100° according to a first embodiment of the present invention.

As shown in FIG. 1, in the first embodiment, a first lens L1, an iris, a second lens L2, a third lens L3 and a fourth lens L4 are sequentially arranged along an optical axis from an object.

Table 1 shows numerical data of respective lenses constituting the lens system according to the first embodiment of the present invention.

TABLE 1

| Surface (surface number) | RDY (radius of curvature) | THI (thickness) | Nd (refractivity) | Vd (ABBE number) |
|---|---|---|---|---|
| OBJ | INFINITY | INFINITY | | |
| 1 | −4.232 | 0.42 | 1.531 | 55.8 |
| 2 | −4.523 | 0.39 | | |
| STO | INFINITY | 0.11 | | |
| 4 | −3.864 | 0.52 | 1.531 | 55.8 |
| 5 | −0.993 | 0.09 | | |
| 6 | −1.381 | 0.69 | 1.531 | 55.8 |
| 7 | −0.594 | 0.03 | | |
| 8 | 1.158 | 0.30 | 1.6375 | 23.0 |
| 9 | 0.559 | 0.25 | | |
| 10 | INFINITY | 0.30 | 1.517 | 64.2 |
| 11 | INFINITY | 0.62 | | |
| IMG | INFINITY | 0.00 | | |

(OBJ: object surface, STO: iris, IMG: image surface, Infinity: planar surface)

As shown in FIG. 1, the first lens L1, the iris STO, the second lens L2, the third lens L3 and the fourth lens L4 are sequentially arranged from the object, and, when the direction of the optical axis is set to an X-axis, and the direction crossing perpendicularly the optical axis is set to an Y-axis, the aspheric surface can be expressed by following Equation 1.

$$X(Y) = \frac{Y^2}{R} \frac{1}{1+\sqrt{1-(1+K)\left(\frac{Y}{R}\right)^2}} + AY^4 + BY^6 + CY^8 + DY^{10} + EY^{12} + FY^{14}$$ [Equation 1]

Here, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 2.

TABLE 2

| | K | A | B | C | D | E | F |
|---|---|---|---|---|---|---|---|
| s1 | 0 | 3.85656E−01 | −3.89214E−01 | 3.15686E−01 | −1.17287E−01 | −4.73153E−04 | 1.06043E−02 |
| s2 | 0 | 6.79828E−01 | −1.56009E+00 | 3.15566E+00 | −4.01509E+00 | 2.81505E+00 | −7.92998E−01 |
| s4 | 0 | −3.64682E−01 | −3.44106E+00 | 2.87600E+01 | −6.23894E+01 | −1.45861E+01 | −2.68636E+00 |
| s5 | 0 | 3.06079E−01 | 5.68396E−01 | −4.92761E+00 | 6.71872E+00 | 0.00000E+00 | 0.00000E+00 |
| s6 | 0 | 7.89712E−01 | −4.45671E−01 | 1.79649E−01 | 8.69763E−03 | 0.00000E+00 | 0.00000E+00 |
| s7 | −0.8997 | 8.77006E−01 | −2.27001E+00 | 3.45943E+00 | −1.74291E−01 | −2.92650E+00 | 1.61054E+00 |
| s8 | 0 | −6.68796E−01 | −2.33125E−01 | 6.38352E−01 | −3.76125E−01 | 0.00000E+00 | 0.00000E+00 |
| s9 | −3.6548 | −2.81690E−01 | 4.44769E−02 | 1.39017E−01 | −1.44531E−01 | 5.60540E−02 | −8.54572E−03 |

Table 3 shows focal lengths, total focal length and values of f1/f and f234/f of the lenses.

TABLE 3

|  |  | focal length | total focal length (f) | f1/f | f3/f |
|---|---|---|---|---|---|
| 1st lens | f1 | −246.93 | 1.47 | −168.33 | 1.02 |
| 2nd lens | f2 | 2.36 |  |  |  |
| 3rd lens | f3 | 1.50 | sum of focal lengths (f234) of L2, L3, L4 | 1.51 |  |
| 4th lens | f4 | −2.09 | f234/f | 1.03 |  |

Table 4 shows the height hc of an effective diameter, the center thickness tc, and the thickness te of the peripheral portion of the effective diameter of the third lens, and the value of te/tc. Table 4 also shows the ratio R_L1S1/f of the radius of curvature R_L1S1 of the front surface of the first lens to the total focal length f. Here, the lens system is designed to satisfy the relation, h_L1S1<h_L4S2, wherein h_L1S1 is the effective diameter of the front surface of the first lens, and h_L4S2 is the effective diameter of the rear surface of the fourth lens.

TABLE 4

| height hc of effective diameter of third lens | | | | radius of curvature (R_L1S1) of front surface of first lens | −4.232 |
|---|---|---|---|---|---|
| center thickness (tc) of third lens | | | | total focal length (f) | 1.47 |
| thickness te of peripheral portion of effective diameter of third lens | | | | R_L1S1/f | −2.8845 |
| hc | tc | te | te/tc | effective diameter (h_L1S1) of front surface of first lens | 1.19 |
| 0.887 | 0.686 | 0.278 | 0.40525 | effective diameter (h_L4S2) of rear surface of fourth lens | 1.32 |

Further, according to the first embodiment of the present invention, the lens system is designed such that the total length t of the lens system is 3.72, and the distance t3 from the rear surface of the first lens to the iris is 0.39, so t3/t of the lens system can satisfy 0.10.

When the maximum image height field is set to 1.0 F, the 90% field of the maximum image height is set to 0.9 F, the 80% field of the maximum image height is set to 0.8 F, the 70% field of the maximum image height is set to 0.7 F, and the 60% field of the maximum image height is set to 0.6 F, Table 5 shows the incidence angles of the main beam of light received on the tangent of the front surface of the first lens and the incidence angles of the main beam of light received on the iris.

TABLE 5

|  | incidence angle of main beam of light received on tangent of front surface of first lens | | incidence angle of main beam of light received on iris | |
|---|---|---|---|---|
| 0.6F | A_6f_fr | 35.4° | A_6f_s | 36.1° |
| 0.7F | A_7f_fr | 39.6° | A_7f_s | 41.4° |
| 0.8F | A_8f_fr | 43.4° | A_8f_s | 46.8° |
| 0.9F | A_9f_fr | 46.9° | A_9f_s | 52.4° |
| 1.0F | A_10f_fr | 50.0° | A_10f_s | 58.9° |

As described above, the first embodiment of the present invention is designed such that, in the field not less than 60% of the maximum image height in the lens system, the incidence angle of the main beam of light received on the iris is larger than the incidence angle of the main beam of light received on the tangent of the front surface of the first lens, so the lens system can correct the distortion.

Figure 2:
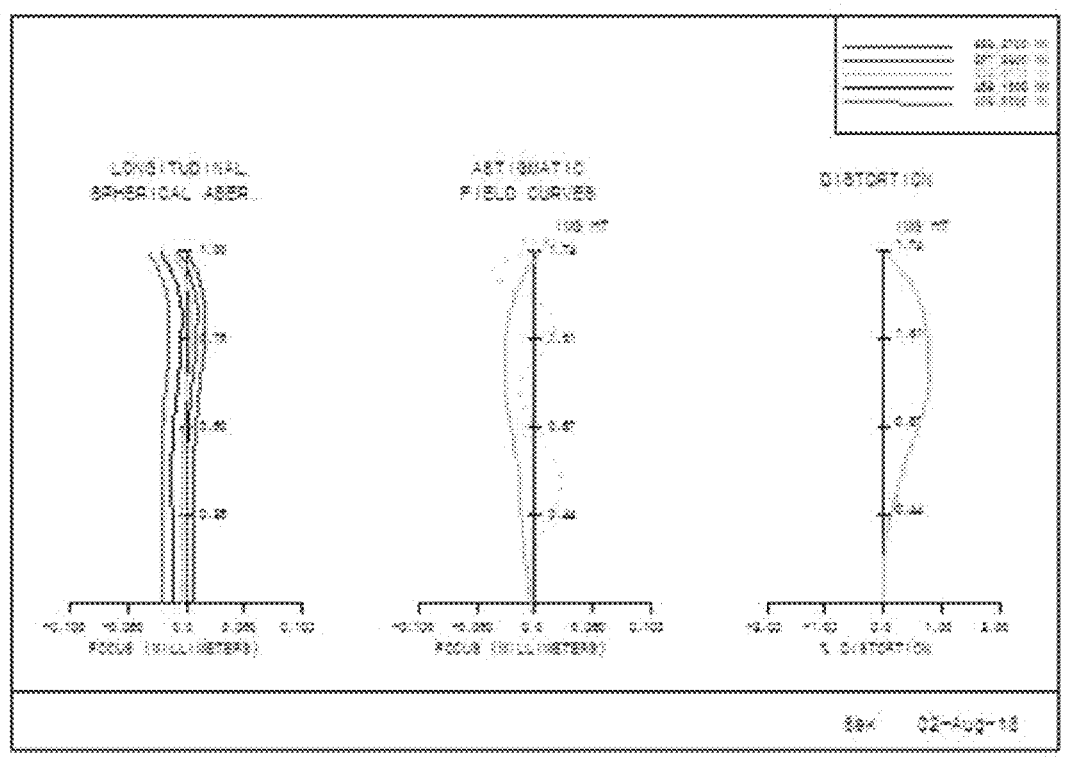
FIG. 2 is a view showing aberration graphs of the wide-angle photographic lens system according to the first embodiment of the present invention.

FIG. 2 is a view showing aberration graphs of the wide-angle photographic lens system according to the first embodiment of the present invention.

The first data of FIG. 2 shows the spherical aberration, in which the horizontal axis shows the focus (mm), the vertical axis shows the image height (mm), and the colors of the graphs show the wave lengths of incident beams of light. As shown in FIG. 2, it is noted that, as the graphs are closer to a center vertical axis and are closer to each other, the lens system can more efficiently correct the spherical aberration. In the first embodiment of the present invention, the spherical aberration does not exceed 0.04 mm (focus) which is determined as an acceptable aberration.

The second data of FIG. 2 shows the astigmatism, in which the horizontal axis shows the focus (mm), the vertical axis shows the image height (mm), the graph S shows a sagittal beam that is a beam of light received in a direction parallel to a lens, and the graph T shows a tangential beam that is a beam of light received in a direction perpendicular to the lens. Here, it is noted that, as the graphs S and T are closer to each other and are closer to the center vertical axis, the lens system can more efficiently correct the astigmatism. In the first embodiment of the present invention, the astigmatism does not exceed 0.03 mm (focus) which is determined as an acceptable aberration.

The third data of FIG. 2 shows the distortion aberration, in which the horizontal axis shows the distortion rate (%), the vertical axis shows the image height (mm), and it is generally noted that, when the aberration curve is included within a range of −2~2%, the distortion aberration is noted as an acceptable aberration. In the first embodiment of the present invention, the optical distortion that is a kind of distortion aberration does not exceed 0.78%, and the TV distortion does not exceed 0.75%, so the lens system of the first embodiment can efficiently compensate for the distortion aberration.

Second Embodiment

Figure 3:
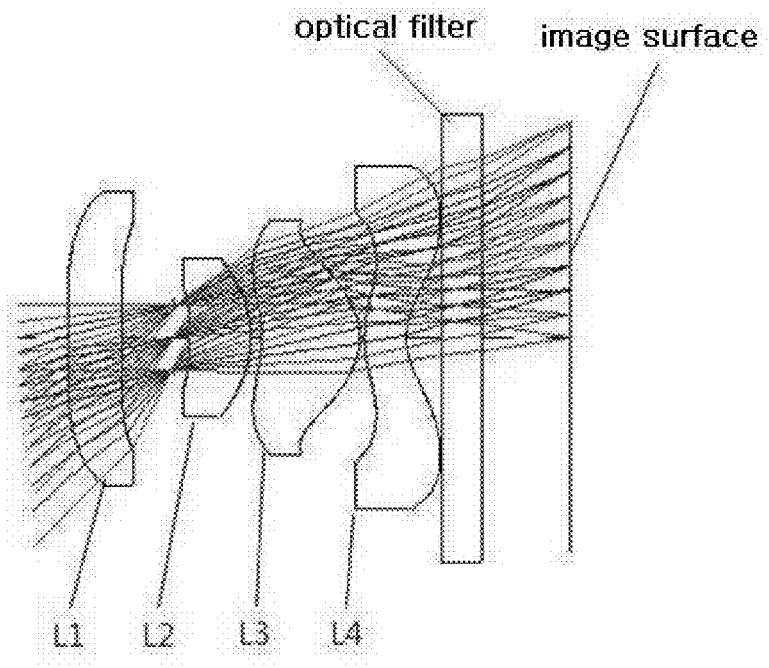
FIG. 3 is a view illustrating a wide-angle photographic lens system enabling correction of distortion according to a second embodiment of the present invention.

FIG. 3 shows a wide-angle photographic lens system having an angle of view of 100° according to a second embodiment of the present invention.

As shown in FIG. 3, a first lens L1, an iris, a second lens L2, a third lens L3 and a fourth lens L4 are sequentially arranged along an optical axis from an object.

Table 6 shows numerical data of respective lenses constituting the lens system according to the second embodiment of the present invention.

TABLE 6

| Surface (surface number) | RDY (radius of curvature) | THI (thickness) | Nd (refractivity) | Vd (ABBE number) |
|---|---|---|---|---|
| OBJ | INFINITY | INFINITY |  |  |
| 1 | −6.227 | 0.38 | 1.531 | 55.8 |
| 2 | −5.132 | 0.38 |  |  |
| STO | INFINITY | 0.11 |  |  |
| 4 | −2.724 | 0.44 | 1.531 | 55.8 |
| 5 | −0.900 | 0.08 |  |  |
| 6 | −1.171 | 0.71 | 1.531 | 55.8 |
| 7 | −0.577 | 0.03 |  |  |
| 8 | 1.132 | 0.30 | 1.6375 | 23.0 |
| 9 | 0.566 | 0.25 |  |  |
| 10 | INFINITY | 0.30 | 1.517 | 64.2 |
| 11 | INFINITY | 0.62 |  |  |
| IMG | INFINITY | 0 |  |  |

(OBJ: object surface, STO: iris, IMG: image surface, Infinity: planar surface)

As shown in FIG. 3, the first lens L1, the iris STO, the second lens L2, the third lens L3 and the fourth lens L4 are sequentially arranged from the object, and, when the direction of the optical axis is set to an X-axis, and the direction crossing perpendicularly the optical axis is set to an Y-axis, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 7.

TABLE 7

|    | K       | A            | B            | C            | D            | E            | F            |
|----|---------|--------------|--------------|--------------|--------------|--------------|--------------|
| s1 | 0       | 3.66212E−01  | −3.96497E−01 | 3.39714E−01  | −1.28876E−01 | −4.22447E−03 | 1.29093E−02  |
| s2 | 0       | 6.19796E−01  | −1.55445E+00 | 3.19664E+00  | −4.05064E+00 | 2.73746E+00  | −7.42394E−01 |
| s4 | 0       | −5.07239E−01 | −2.31935E+00 | 8.16324E+00  | 1.90273E+01  | −1.45861E+01 | −2.68636E+00 |
| s5 | 0       | 4.39602E−01  | 7.11464E−01  | −6.36411E+00 | 9.19286E+00  | 0.00000E+00  | 0.00000E+00  |
| s6 | 0       | 9.48467E−01  | −5.49288E−01 | 3.05827E−01  | −4.67578E−02 | 0.00000E+00  | 0.00000E+00  |
| s7 | −0.8596 | 8.52005E−01  | −2.32316E+00 | 3.36575E+00  | 5.50728E−02  | −2.63925E+00 | 1.29671E+00  |
| s8 | 0       | −6.01231E−01 | −5.10158E−01 | 1.01610E+00  | −5.52417E−01 | 0.00000E+00  | 0.00000E+00  |
| s9 | −3.3683 | −3.03349E−01 | 4.99608E−02  | 1.50044E−01  | −1.42568E−01 | 4.81963E−02  | −6.27545E−03 |

Table 8 shows focal lengths, total focal length and values of f1/f and f3/f of the lenses.

TABLE 8

|          |    | focal length | total focal length (f) | f1/f  | f3/f |
|----------|----|--------------|------------------------|-------|------|
| 1st lens | f1 | 48.78        | 1.47                   | 33.26 | 1.03 |
| 2nd lens | f2 | 2.33         |                        |       |      |
| 3rd lens | f3 | 1.51         | Sum of focal lengths (f234) of L2, L3, L4 | 1.51 |   |
| 4th lens | f4 | −2.22        | f234/f                 | 1.03  |      |

Table 9 shows the height hc of an effective diameter, the center thickness tc, and the thickness te of the peripheral portion of the effective diameter of the third lens, and the value of te/tc. Table 9 also shows the ratio R_L1S1/f of the radius of curvature R_L1S1 of the front surface of the first lens to the total focal length f. Here, the lens system is designed to satisfy the relation, h_L1S1<h_L4S2, wherein h_L1S1 is the effective diameter of the front surface of the first lens, and h_L4S2 is the effective diameter of the rear surface of the fourth lens.

TABLE 9

| height hc of effective diameter of third lens | | | | radius of curvature (R_L1S1) of front surface of first lens | −6.227 |
|---|---|---|---|---|---|
| center thickness (tc) of third lens | | | | total focal length (f) | 1.47 |
| thickness te of peripheral portion of effective diameter of third lens | | | | R_L1S1/f | −4.2447 |
| hc | tc | te | te/tc | effective diameter (h_L1S1) of front surface of first lens | 1.17 |
| 0.858 | 0.707 | 0.276 | 0.39038 | effective diameter (h_L4S2) of rear surface of fourth lens | 1.32 |

Further, according to the second embodiment of the present invention, the lens system is designed such that the total length t of the lens system is 3.75, and the distance t3 from the rear surface of the first lens to the iris is 0.38, so t3/t of the lens system can satisfy 0.11.

When the maximum image height field is set to 1.0 F, the 90% field of the maximum image height is set to 0.9 F, the 80% field of the maximum image height is set to 0.8 F, the 70% field of the maximum image height is set to 0.7 F, and the 60% field of the maximum image height is set to 0.6 F, Table 10 shows the incidence angles of the main beam of light received on the tangent of the front surface of the first lens and the incidence angles of the main beam of light received on the iris.

TABLE 10

|      | incidence angle of main beam of light received on tangent of front surface of first lens | | incidence angle of main beam of light received on iris | |
|------|-----------|-------|-----------|-------|
| 0.6F | A_6f_fr   | 35.3° | A_6f_s    | 36.9° |
| 0.7F | A_7f_fr   | 39.6° | A_7f_s    | 42.4° |
| 0.8F | A_8f_fr   | 43.4° | A_8f_s    | 47.9° |
| 0.9F | A_9f_fr   | 46.9° | A_9f_s    | 53.6° |
| 1.0F | A_10f_fr  | 50.0° | A_10f_s   | 60.4° |

As described above, the second embodiment of the present invention is designed such that, in the field not less than 60% of the maximum image height in the lens system, the incidence angle of the main beam of light received on the iris is larger than the incidence angle of the main beam of light received on the tangent of the front surface of the first lens, so the lens system can correct the distortion.

Figure 4:
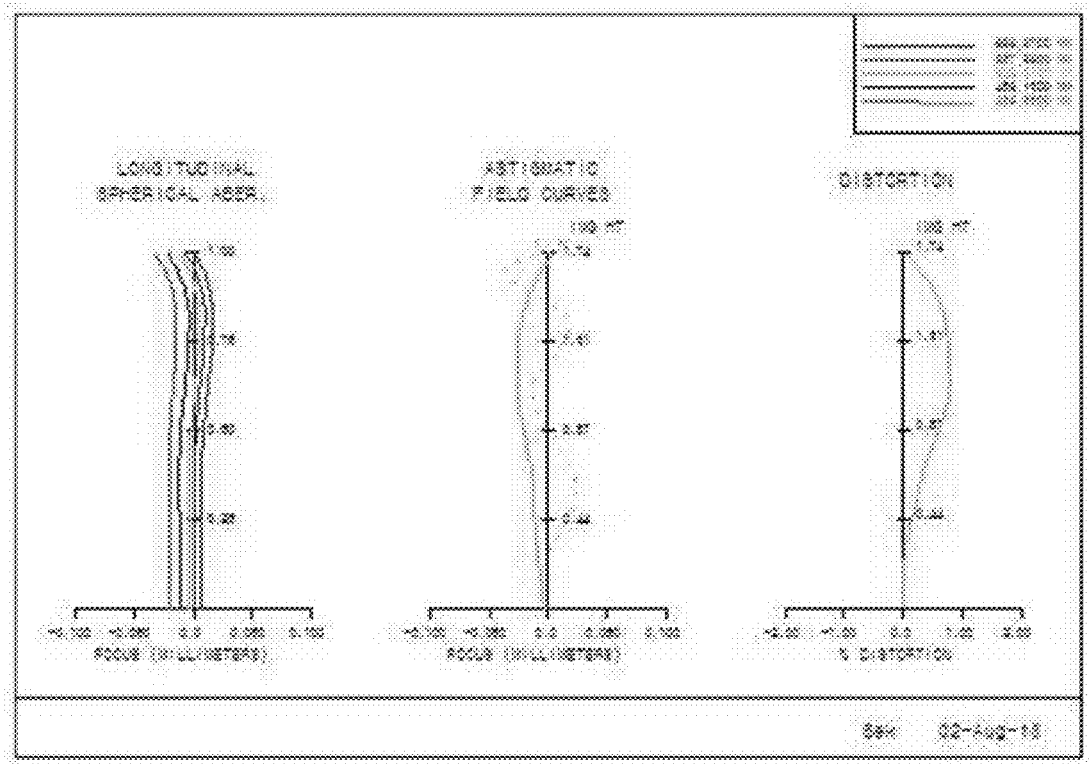
FIG. 4 is a view showing aberration graphs of the wide-angle photographic lens system according to the second embodiment of the present invention.

FIG. 4 is a view showing aberration graphs of the wide-angle photographic lens system according to the second embodiment of the present invention.

The first data of FIG. 4 shows the spherical aberration, in which the horizontal axis shows the focus (mm), the vertical axis shows the image height (mm), and the colors of the graphs show the wave lengths of incident beams of light. As shown in FIG. 4, it is noted that, as the graphs are closer to a center vertical axis and are closer to each other, the lens system can more efficiently correct the spherical aberration. In the second embodiment of the present invention, the spherical aberration does not exceed 0.04 mm (focus) which is determined as an acceptable aberration.

The second data of FIG. 4 shows the astigmatism, in which the horizontal axis shows the focus (mm), the vertical axis shows the image height (mm), the graph S shows a sagittal beam that is a beam of light received in a direction parallel to a lens, and the graph T shows a tangential beam that is a beam of light received in a direction perpendicular to the lens. Here, it is noted that, as the graphs S and T are closer to each other and are closer to the center vertical axis, the lens system can more efficiently correct the astigmatism. In the second embodiment of the present invention, the astigmatism does not exceed 0.03 mm (focus) which is determined as an acceptable aberration.

The third data of FIG. 4 shows the distortion aberration, in which the horizontal axis shows the distortion rate (%), the vertical axis shows the image height (mm), and it is generally noted that, when the aberration curve is included within a range of −2~2%, the distortion aberration is noted as an acceptable aberration. In the second embodiment of the present invention, the optical distortion that is a kind of distortion aberration does not exceed 1.0%, and the TV distortion does not exceed 0.67%, so the lens system of the second embodiment can efficiently compensate for the distortion aberration.

Third Embodiment

Figure 5:
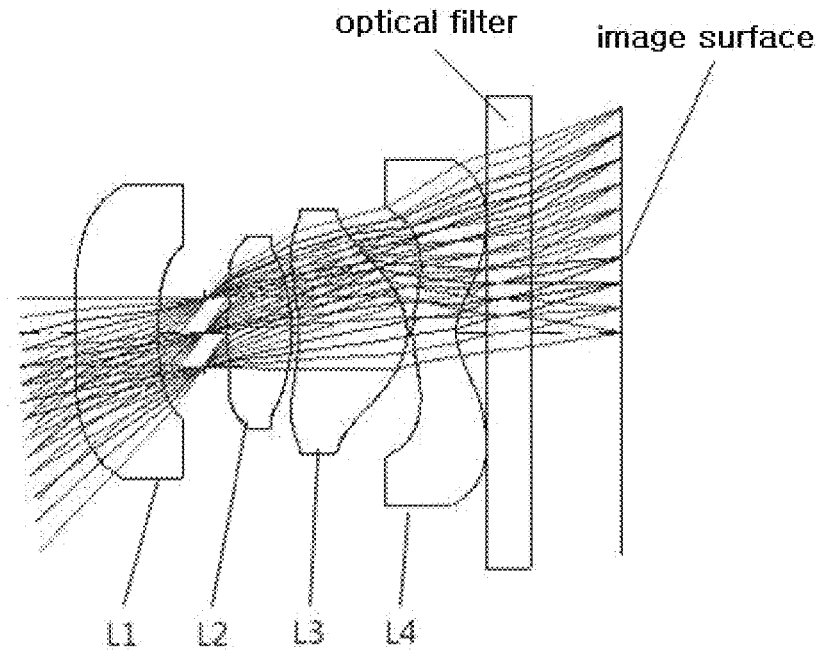
FIG. 5 is a view illustrating a wide-angle photographic lens system enabling correction of distortion according to a third embodiment of the present invention.

FIG. 5 shows a wide-angle photographic lens system having an angle of view of 100° according to a third embodiment of the present invention.

As shown in FIG. 5, a first lens L1, an iris, a second lens L2, a third lens L3 and a fourth lens L4 are sequentially arranged along an optical axis from an object.

Table 11 shows numerical data of respective lenses constituting the lens system according to the third embodiment of the present invention.

TABLE 11

| Surface (surface number) | RDY (radius of curvature) | THI (thickness) | Nd (refractivity) | Vd (ABBE number) |
|---|---|---|---|---|
| OBJ | INFINITY | INFINITY | | |
| 1 | −25.224 | 0.57 | 1.531 | 55.8 |
| 2 | 6.817 | 0.31 | | |
| STO | INFINITY | 0.02 | | |
| 4 | 5.770 | 0.43 | 1.531 | 55.8 |
| 5 | −1.751 | 0.05 | | |
| 6 | −1.872 | 0.74 | 1.531 | 55.8 |
| 7 | −0.562 | 0.04 | | |
| 8 | 1.098 | 0.30 | 1.6375 | 23.0 |
| 9 | 0.503 | 0.21 | | |
| 10 | INFINITY | 0.30 | 1.517 | 64.2 |
| 11 | INFINITY | 0.63 | | |
| IMG | INFINITY | 0 | | |

(OBJ: object surface, STO: iris, IMG: image surface, Infinity: planar surface)

As shown in FIG. 5, the first lens L1, the iris STO, the second lens L2, the third lens L3 and the fourth lens L4 are sequentially arranged from the object, and, when the direction of the optical axis is set to an X-axis, and the direction crossing perpendicularly the optical axis is set to an Y-axis, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 12.

Table 13 shows focal lengths, total focal length and values of f1/f and f3/f of the lenses.

TABLE 13

| | focal length | | total focal length (f) | f1/f | f3/f |
|---|---|---|---|---|---|
| 1st lens | f1 | −10.00 | 1.47 | −6.81 | 0.86 |
| 2nd lens | f2 | 2.57 | | | |
| 3rd lens | f3 | 1.26 | Sum of focal lengths (f234) of L2, L3, L4 | 1.4 | |
| 4th lens | f4 | −1.80 | f234/f | 0.95 | |

Table 14 shows the height hc of an effective diameter, the center thickness tc, and the thickness te of the peripheral portion of the effective diameter of the third lens, and the value of te/tc. Table 14 also shows the ratio R_L1S1/f of the radius of curvature R_L1S1 of the front surface of the first lens to the total focal length f. Here, the lens system is designed to satisfy the relation, h_L1S1<h_L4S2, wherein h_L1S1 is the effective diameter of the front surface of the first lens, and h_L4S2 is the effective diameter of the rear surface of the fourth lens.

TABLE 14

| height hc of effective diameter of third lens | | | | radius of curvature (R_L1S1) of front surface of first lens | −25.224 |
|---|---|---|---|---|---|
| center thickness (tc) of third lens | | | | total focal length (f) | 1.47 |
| thickness te of peripheral portion of effective diameter of third lens | | | | R_L1S1/f | −17.179 |
| hc | tc | te | te/tc | effective diameter (h_L1S1) of front surface of first lens | 1.11 |
| 0.877 | 0.744 | 0.28 | 0.37634 | effective diameter (h_L4S2) of rear surface of fourth lens | 1.32 |

Further, according to the third embodiment of the present invention, the lens system is designed such that the total length t of the lens system is 3.75, and the distance t3 from the rear surface of the first lens to the iris is 0.31, so t3/t of the lens system can satisfy 0.08.

When the maximum image height field is set to 1.0 F, the 90% field of the maximum image height is set to 0.9 F, the 80% field of the maximum image height is set to 0.8 F, the 70% field of the maximum image height is set to 0.7 F, and the 60% field of the maximum image height is set to 0.6 F, Table 15 shows the incidence angles of the main beam of light received on the tangent of the front surface of the first lens and the incidence angles of the main beam of light received on the iris.

TABLE 12

| | K | A | B | C | D | E | F |
|---|---|---|---|---|---|---|---|
| s1 | 0 | 2.83303E−01 | −2.35827E−01 | 2.43868E−01 | −1.25720E−01 | 1.39500E−02 | 1.46305E−02 |
| s2 | 0 | 6.70983E−01 | −6.50122E−01 | 7.19322E−01 | 1.00381E+00 | 7.25641E−07 | 3.94042E−07 |
| s4 | 0 | −1.50555E−01 | −2.47654E+00 | 1.20971E+01 | −1.07807E+01 | 5.56282E−01 | −2.68623E+00 |
| s5 | 0 | 4.02311E−02 | 4.08514E−01 | −5.00626E+00 | 8.71022E+00 | 0.00000E+00 | 0.00000E+00 |
| s6 | 0 | 3.48450E−01 | −1.52325E−01 | 6.70677E−01 | −5.77807E−01 | 0.00000E+00 | 0.00000E+00 |
| s7 | −0.8222 | 7.16220E−01 | −1.87901E+00 | 3.40328E+00 | −3.92028E−01 | −2.98135E+00 | 1.74243E+00 |
| s8 | 0 | −1.17371E+00 | 3.43797E−01 | 4.68280E−01 | 3.64036E−01 | −1.79231E+00 | 9.23330E−01 |
| s9 | −3.3769 | −6.24712E−01 | 5.51080E−01 | −1.12550E−01 | −1.94752E−01 | 1.35561E−01 | −2.67710E−02 |

TABLE 15

| | incidence angle of main beam of light received on tangent of front surface of first lens | | incidence angle of main beam of light received on iris | |
|---|---|---|---|---|
| 0.6F | A__6f__fr | 35.6° | A__6f__s | 36.3° |
| 0.7F | A__7f__fr | 39.8° | A__7f__s | 41.6° |
| 0.8F | A__8f__fr | 43.4° | A__8f__s | 46.7° |
| 0.9F | A__9f__fr | 46.8° | A__9f__s | 52.1° |
| 1.0F | A__10f__fr | 50.0° | A__10f__s | 58.1° |

As described above, the third embodiment of the present invention is designed such that, in the field not less than 60% of the maximum image height in the lens system, the incidence angle of the main beam of light received on the iris is larger than the incidence angle of the main beam of light received on the tangent of the front surface of the first lens, so the lens system can correct the distortion.

Figure 6:
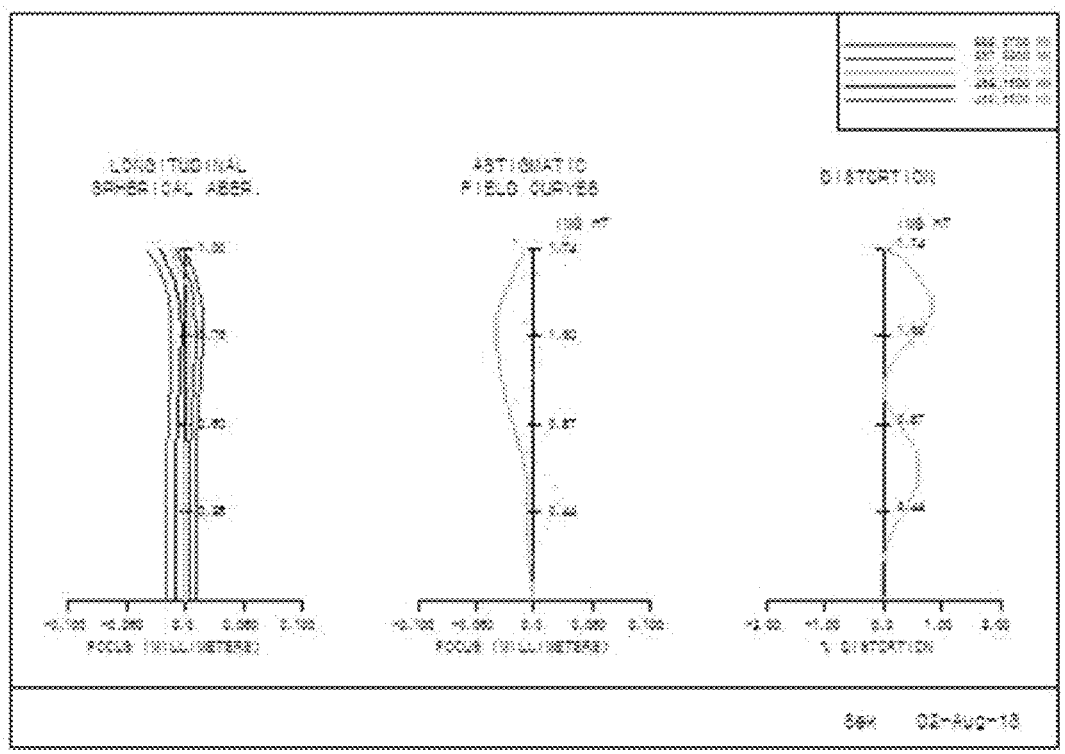
FIG. 6 is a view showing aberration graphs of the wide-angle photographic lens system according to the third embodiment of the present invention.

FIG. 6 is a view showing aberration graphs of the wide-angle photographic lens system according to the third embodiment of the present invention.

The first data of FIG. 6 shows the spherical aberration, in which the horizontal axis shows the focus (mm), the vertical axis shows the image height (mm), and the colors of the graphs show the wave lengths of incident beams of light. As shown in FIG. 6, it is noted that, as the graphs are closer to a center vertical axis and are closer to each other, the lens system can more efficiently correct the spherical aberration. In the third embodiment of the present invention, the spherical aberration does not exceed 0.04 mm (focus) which is determined as an acceptable aberration.

The second data of FIG. 6 shows the astigmatism, in which the horizontal axis shows the focus (mm), the vertical axis shows the image height (mm), the graph S shows a sagittal beam that is a beam of light received in a direction parallel to a lens, and the graph T shows a tangential beam that is a beam of light received in a direction perpendicular to the lens. Here, it is noted that, as the graphs S and T are closer to each other and are closer to the center vertical axis, the lens system can more efficiently correct the astigmatism. In the third embodiment of the present invention, the astigmatism does not exceed 0.05 mm (focus) which is determined as an acceptable aberration.

The third data of FIG. 6 shows the distortion aberration, in which the horizontal axis shows the distortion rate (%), the vertical axis shows the image height (mm), and it is generally noted that, when the aberration curve is included within a range of −2∼2%, the distortion aberration is noted as an acceptable aberration. In the third embodiment of the present invention, the optical distortion that is a kind of distortion aberration does not exceed 0.83%, and the TV distortion does not exceed 0.83%, so the lens system of the third embodiment can efficiently compensate for the distortion aberration.

Fourth Embodiment

Figure 7:
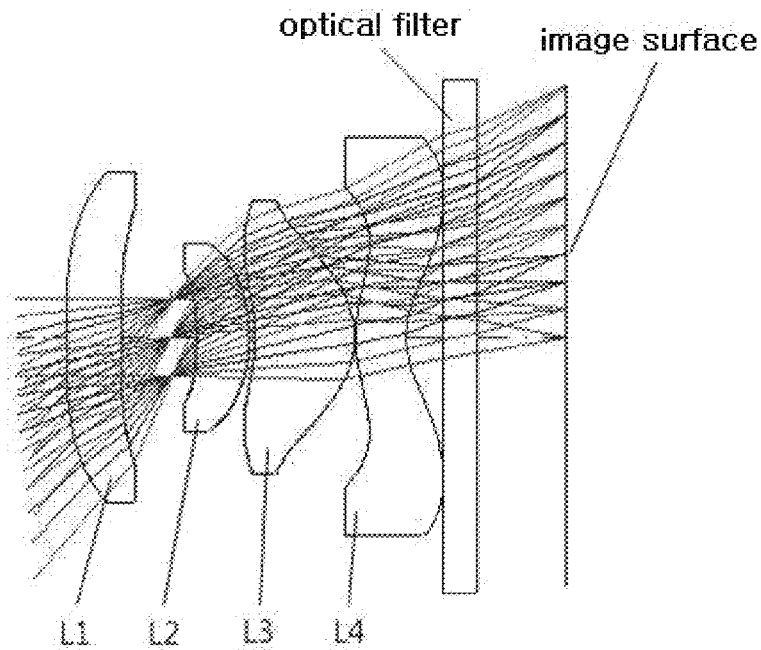
FIG. 7 is a view illustrating a wide-angle photographic lens system enabling correction of distortion according to a fourth embodiment of the present invention.

FIG. 7 shows a wide-angle photographic lens system having an angle of view of 100° according to a fourth embodiment of the present invention.

As shown in FIG. 7, a first lens L1, an iris, a second lens L2, a third lens L3 and a fourth lens L4 are sequentially arranged along an optical axis from an object.

Table 16 shows numerical data of respective lenses constituting the lens system according to the fourth embodiment of the present invention.

TABLE 16

| Surface (surface number) | RDY (radius of curvature) | THI (thickness) | Nd (refractivity) | Vd (ABBE number) |
|---|---|---|---|---|
| OBJ | INFINITY | INFINITY | | |
| 1 | 249.511 | 0.50 | 1.531 | 55.8 |
| 2 | −19.875 | 0.45 | | |
| STO | INFINITY | 0.23 | | |
| 4 | −3.970 | 0.48 | 1.531 | 55.8 |
| 5 | −1.309 | 0.05 | | |
| 6 | −1.441 | 0.90 | 1.531 | 55.8 |
| 7 | −0.701 | 0.01 | | |
| 8 | 1.510 | 0.45 | 1.6375 | 23 |
| 9 | 0.713 | 0.34 | | |
| 10 | INFINITY | 0.30 | 1.517 | 64.2 |
| 11 | INFINITY | 0.81 | | |
| IMG | INFINITY | 0 | | |

(OBJ: object surface, STO: iris, IMG: image surface, Infinity: planar surface)

As shown in FIG. 7, the first lens L1, the iris STO, the second lens L2, the third lens L3 and the fourth lens L4 are sequentially arranged from the object, and, when the direction of the optical axis is set to an X-axis, and the direction crossing perpendicularly the optical axis is set to an Y-axis, the aspheric surface is a curved surface formed by rotating a curved line obtained from the aspheric surface equation that is Equation 1 around the optical axis. In Equation 1, R is a radius of curvature, K is a conic constant, and A, B, C, D, E and F are aspheric surface coefficients.

The aspheric surface coefficients in Equation 1 which have data of the respective lenses are shown in Table 17.

TABLE 17

| | K | A | B | C | D | E | F |
|---|---|---|---|---|---|---|---|
| s1 | 0 | 1.40899E−01 | −8.49158E−02 | 4.39782E−02 | −1.14493E−02 | 1.37244E−03 | −9.16570E−05 |
| s2 | 0 | 2.54633E−01 | −4.10011E−01 | 5.14399E−01 | −3.92954E−01 | 1.59184E−01 | −2.64859E−02 |
| s4 | 0 | −4.16636E−01 | −2.04682E−01 | 2.15252E+00 | 5.63511E+00 | −8.37960E−01 | −9.18045E−02 |
| s5 | 0 | 5.48837E−02 | 5.46518E−02 | −7.43848E−01 | 5.19333E−01 | 0.00000E+00 | 0.00000E+00 |
| s6 | 0 | 4.17881E−01 | −1.29133E−01 | 3.10844E−02 | −7.38627E−04 | 0.00000E+00 | 0.00000E+00 |
| s7 | −0.8654 | 4.15074E−01 | −6.18869E−01 | 4.91068E−01 | 7.33423E−03 | −1.33472E−01 | 3.71286E−02 |
| s8 | 0 | −2.61629E−01 | −5.27086E−02 | 6.00552E−02 | −2.05276E−02 | 0.00000E+00 | 0.00000E+00 |
| s9 | −3.9093 | −8.49719E−02 | −1.27476E−02 | 2.32269E−02 | −1.00753E−02 | 1.90186E−03 | −1.39000E−04 |

Table 18 shows focal lengths, the total focal length and the values of f1/f and f3/f of the lenses.

TABLE 18

| | focal length | | total focal length (f) | f1/f | f3/f |
|---|---|---|---|---|---|
| 1st lens | f1 | 34.54 | 1.91 | 18.13 | 0.94 |
| 2nd lens | f2 | 3.45 | | | |
| 3rd lens | f3 | 1.80 | sum of focal lengths (f234) of L2, L3, L4 | 1.94 | |
| 4th lens | f4 | −2.70 | f234/f | 1.02 | |

Table 19 shows the height hc of an effective diameter, the center thickness tc, and the thickness te of the peripheral portion of the effective diameter of the third lens, and the value of te/tc. Table 19 also shows the ratio R_L1S1/f of the radius of curvature R_L1S1 of the front surface of the first lens to the total focal length f. Here, the lens system is designed to satisfy the relation, h_L1S1<h_L4S2, wherein h_L1S1 is the effective diameter of the front surface of the first lens, and h_L4S2 is the effective diameter of the rear surface of the fourth lens.

TABLE 19

| height hc of effective diameter of third lens | | | | radius of curvature (R_L1S1) of front surface of first lens | 249.511 |
|---|---|---|---|---|---|
| center thickness (tc) of third lens | | | | total focal length (f) | 1.91 |
| thickness te of peripheral portion of effective diameter of third lens | | | | R_L1S1/f | 130.96 |
| hc | tc | te | te/tc | effective diameter (h_L1S1) of front surface of first lens | 1.45 |
| 0.164 | 0.902 | 0.266 | 0.2949 | effective diameter (h_L4S2) of rear surface of fourth lens | 1.75 |

Further, in the lens system according to the fourth embodiment of the present invention, the total length t of the lens system is 4.51, and the distance t3 from the rear surface of the first lens to the iris is 0.45, so t3/t can satisfy 0.10.

When the maximum image height field is set to 1.0 F, the 90% field of the maximum image height is set to 0.9 F, the 80% field of the maximum image height is set to 0.8 F, the 70% field of the maximum image height is set to 0.7 F, and the 60% field of the maximum image height is set to 0.6 F, Table 20 shows the incidence angles of the main beam of light received on the tangent of the front surface of the first lens and the incidence angles of the main beam of light received on the iris.

TABLE 20

| incidence angle of main beam of light received on tangent of front surface of first lens | | incidence angle of main beam of light received on iris | |
|---|---|---|---|
| 0.6F | A_6f_fr | 35.3° | A_6f_s | 38.0° |
| 0.7F | A_7f_fr | 39.5° | A_7f_s | 43.6° |
| 0.8F | A_8f_fr | 43.4° | A_8f_s | 49.2° |
| 0.9F | A_9f_fr | 46.9° | A_9f_s | 55.0° |
| 1.0F | A_10f_fr | 50.0° | A_10f_s | 61.3° |

As described above, the fourth embodiment of the present invention is designed such that, in the field not less than 60% of the maximum image height in the lens system, the incidence angle of the main beam of light received on the iris is larger than the incidence angle of the main beam of light received on the tangent of the front surface of the first lens, so the lens system can correct the distortion.

Figure 8:
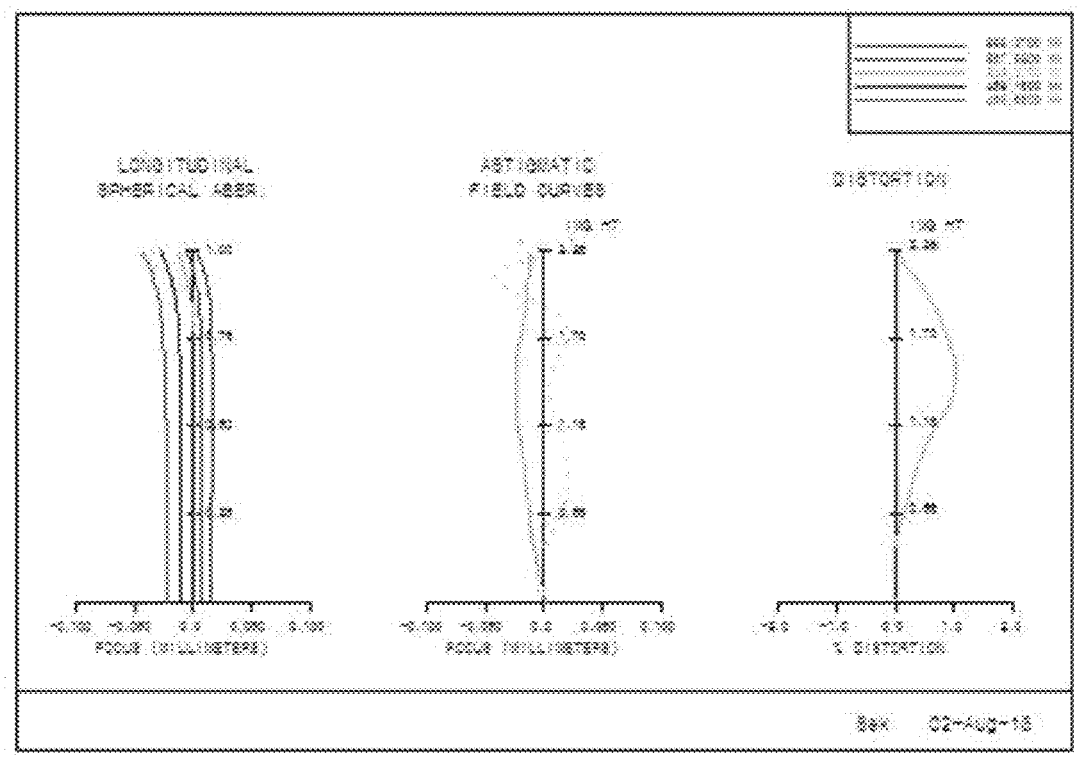
FIG. 8 is a view showing aberration graphs of the wide-angle photographic lens system according to the fourth embodiment of the present invention.

FIG. 8 is a view showing aberration graphs of the wide-angle photographic lens system according to the fourth embodiment of the present invention.

The first data of FIG. 8 shows the spherical aberration, in which the horizontal axis shows the focus (mm), the vertical axis shows the image height (mm), and the colors of the graphs show the wave lengths of incident beams of light. As shown in FIG. 8, it is noted that, as the graphs are closer to a center vertical axis and are closer to each other, the lens system can more efficiently correct the spherical aberration. In the fourth embodiment of the present invention, the spherical aberration does not exceed 0.05 mm (focus) which is determined as an acceptable aberration.

The second data of FIG. 8 shows the astigmatism, in which the horizontal axis shows the focus (mm), the vertical axis shows the image height (mm), the graph S shows a sagittal beam that is a beam of light received in a direction parallel to a lens, and the graph T shows a tangential beam that is a beam of light received in a direction perpendicular to the lens. Here, it is noted that, as the graphs S and T are closer to each other and are closer to the center vertical axis, the lens system can more efficiently correct the astigmatism. In the fourth embodiment of the present invention, the astigmatism does not exceed 0.05 mm (focus) which is determined as an acceptable aberration.

The third data of FIG. 8 shows the distortion aberration, in which the horizontal axis shows the distortion rate (%), the vertical axis shows the image height (mm), and it is generally noted that, when the aberration curve is included within a range of −2~2%, the distortion aberration is noted as an acceptable aberration. In the fourth embodiment of the present invention, the optical distortion that is a kind of distortion aberration does not exceed 1.0%, and the TV distortion does not exceed 0.79%, so the lens system of the fourth embodiment can efficiently compensate for the distortion aberration.

The wide-angle photographic lens system of the present invention is composed of four lenses, in which refractivities of respective lenses, the focal length and shape of a third lens, incidence angles of a main beam of light in the lenses, and intervals between the lenses, etc. are appropriately designed, so the lens system can realize smallness and can enable correction of distortion, thereby having a distortion-corrected wide angle of view of 90° or more and providing an image with high resolution.

Particularly, the present invention is designed such that, in a field not less than 60% of the maximum image height in the lens system, the incidence angle A_s of a main beam of light received on an iris is larger than the incidence angle A_fr of the main beam of light received on a tangent of the center of the front surface of the first lens, thereby providing a wide-angle photographic lens system enabling correction of distortion, the spherical aberration, astigmatism and distortion aberration of which are acceptable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood as falling within the scope of the present invention.

What is claimed is:

1. A wide-angle photographic lens system enabling correction of distortion, comprising: a first lens, an iris, a second lens, a third lens and a fourth lens sequentially arranged along an optical axis from an object, wherein the first lens has weak refractivity, the second lens has positive refractivity, the third lens has strong positive refractivity, and the fourth lens has negative refractivity, wherein the lens system satisfies relations, $|f1/f|>4, f3/f<1.5,$ and $te/tc<0.5,$ wherein f1 is a focal length of the first lens, f is a total focal length of all the lenses, f3 is a focal length of the third lens, to is a lens thickness on an effective diameter of a rear surface of the third lens, and tc is a center thickness of the third lens.

2. The wide-angle photographic lens system enabling correction of distortion as set forth in claim 1, wherein incidence angles of a main beam of light in a field not less than 60% of a maximum image height in the lens system satisfy a relation, $$A\_fr < A\_s,$$

wherein A_fr is an incidence angle of the main beam of light received on a tangent of a center of a front surface of the first lens, and A_s is an incidence angle of the main beam of light received on the iris.

3. The wide-angle photographic lens system enabling correction of distortion as set forth in claim 1 or 2, satisfying a relation, $$|R\_L1S1/f| > 2.5,$$

wherein R_L1S1 is a radius of curvature of a front surface of the first lens.

4. The wide-angle photographic lens system enabling correction of distortion as set forth in claim 1 or 2, satisfying a relation, $$h\_L1S1 < h\_L4S2,$$

wherein h_L1S1 is an effective diameter of a front surface of the first lens, and h_L4S2 is an effective diameter of a rear surface of the fourth lens.

5. The wide-angle photographic lens system enabling correction of distortion as set forth in claim 1 or 2, satisfying a relation, $$t3/t > 0.07,$$

wherein t3 is an interval between a rear surface of the first lens and the iris, and t is a total length of the lens system which is a distance from a front surface of the first lens to an image surface.

6. The wide-angle photographic lens system enabling correction of distortion as set forth in claim 1 or 2, satisfying a relation, $$f234/f > 0.85,$$

wherein f is the total focal length of all the lenses, and f234 is a sum of focal lengths of the second lens, the third lens and the fourth lens.

7. The wide-angle photographic lens system enabling correction of distortion as set forth in claim 1 or 2, wherein the first lens has aspheric surfaces on opposite surfaces, the second lens has an aspheric surface on at least one surface, the third lens has aspheric surfaces on opposite surfaces, and the fourth lens has aspheric surfaces on opposite surfaces.

8. The wide-angle photographic lens system enabling correction of distortion as set forth in claim 1 or 2, wherein any one or more of the first lens, the second lens, the third lens and the fourth lens are made of a material different from a material of remaining lenses.

9. A wide-angle photographic lens system enabling correction of distortion, comprising: a first lens, an iris, a second lens, a third lens and a fourth lens sequentially arranged along an optical axis from an object, wherein the first lens has weak refractivity, the second lens has positive refractivity, the third lens has strong positive refractivity, and the fourth lens has negative refractivity, wherein incidence angles of a main beam of light in a field not less than 70% of a maximum image height in the lens system satisfy a relation, $$A\_fr < A\_s,$$

wherein A_fr is an incidence angle of the main beam of light received on a tangent of a center of a front surface of the first lens, and A_s is an incidence angle of the main beam of light received on the iris.

10. The wide-angle photographic lens system enabling correction of distortion as set forth in claim 9, satisfying relations, |f1/f| > 4, f3/f < 1.5, and te/tc < 0.5, wherein f1 is a focal length of the first lens, f is a total focal length of all the lenses, f3 is a focal length of the third lens, to is a lens thickness on an effective diameter of a rear surface of the third lens, and tc is a center thickness of the third lens.

11. The wide-angle photographic lens system enabling correction of distortion as set forth in claim 9 or 10, satisfying a relation, $$|R\_L1S1/f| > 2.5,$$

wherein R_L1S1 is a radius of curvature of the front surface of the first lens.

12. The wide-angle photographic lens system enabling correction of distortion as set forth in claim 9 or 10, satisfying a relation, $$h\_L1S1 < h\_L4S2,$$

wherein h_L1S1 is an effective diameter of the front surface of the first lens, and h_L4S2 is an effective diameter of a rear surface of the fourth lens.

13. The wide-angle photographic lens system enabling correction of distortion as set forth in claim 9 or 10, satisfying a relation, $$t3/t > 0.07,$$

wherein t3 is an interval from a rear surface of the first lens to the iris, and t is a total length of the lens system which is a distance from the front surface of the first lens to an image surface.

14. The wide-angle photographic lens system enabling correction of distortion as set forth in claim 9 or 10, satisfying a relation, $$f234/f > 0.85,$$

wherein f is a total focal length of all the lenses, and f234 is a sum of focal lengths of the second lens, the third lens and the fourth lens.

15. The wide-angle photographic lens system enabling correction of distortion as set forth in claim 9 or 10, wherein the first lens has aspheric surfaces on opposite surfaces, the second lens has an aspheric surface on at least one surface, the third lens has aspheric surfaces on opposite surfaces, and the fourth lens has aspheric surfaces on opposite surfaces.

16. The wide-angle photographic lens system enabling correction of distortion as set forth in claim 9 or 10, wherein any one or more of the first lens, the second lens, the third lens and the fourth lens are made of a material different from a material of remaining lenses.

* * * * *